US006658136B1

(12) United States Patent
Brumitt

(10) Patent No.: US 6,658,136 B1
(45) Date of Patent: Dec. 2, 2003

(54) SYSTEM AND PROCESS FOR LOCATING AND TRACKING A PERSON OR OBJECT IN A SCENE USING A SERIES OF RANGE IMAGES

(75) Inventor: Barrett L. Brumitt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/455,822

(22) Filed: Dec. 6, 1999

(51) Int. Cl.$^7$ .................................................. G06K 9/00
(52) U.S. Cl. ....................................... 382/103; 382/154
(58) Field of Search ................................ 382/103, 104, 382/106, 107, 173, 154; 348/14.1, 47, 48, 49, 50, 169; 356/12; 250/559.31; 345/863

(56) References Cited

U.S. PATENT DOCUMENTS

| 5,098,182 | A | * | 3/1992 | Brown | 224/908 |
| 5,253,071 | A | * | 10/1993 | MacKay | 348/208.11 |
| 5,881,321 | A | * | 3/1999 | Kivolowitz | 348/61 |
| 5,914,748 | A | * | 6/1999 | Parulski et al. | 348/239 |
| 6,188,777 | B1 | * | 2/2001 | Darrell et al. | 348/169 |
| 6,400,831 | B2 | * | 6/2002 | Lee et al. | 348/169 |

OTHER PUBLICATIONS

Sanja Rojic, Term project for CS 525: Tracking People Using Range Information, obtained from the website http://www.cs.ubc.ca/spider/rogic/projects.html.*
C. Wren, A. Azarbayejani, T. Darrell and A. Pentland. Pfinder: Real–time tracking of the human body. In IEEE Transactions on Pattern Analysis and Machine Intelligence, Jul. 1997, vol. 19, No. 7, pp. 780–785.
I. Haritaoglu. Real–time system fo detection and tracking of people and recognizing their activities. University of Maryland technical report.
M. Isard and A. Blake. Contour tracking by stochastic propagation of conditional density. Proc. ECCV 1996.
S. Rowe and A. Blake. Statistical mosaics for tracking. J Image and Vision Computing, 14(8), 1996.

(List continued on next page.)

Primary Examiner—Brian Werner
Assistant Examiner—Ryan J. Miller
(74) Attorney, Agent, or Firm—Lyon & Harr, L.L.P.; Richard T. Lyon; Craig S. Fischer

(57) ABSTRACT

A system and method for locating and tracking people and non-stationary objects of interest in a scene using a series of range images of the scene taken over time. The system and process generally entails first generating the series of range images which are preferably a continuous temporal sequence of depth maps of the scene. A background model is computed from a block of the range images. Once the background model has been computed, a range image generated subsequent to the block of range images is selected for processing. The background is then subtracted from this currently selected range image based on the background model to produce a foreground image. The foreground image is next segmented into regions, each of which represents a different person or object of interest in the scene captured by the currently selected range image. The locating process continues by projecting the segmented regions of the foreground image onto a ground plane of the scene. The ground plane coordinates determined in the projection procedure can be used to designate the location of each separate person or object of interest in the scene captured by the currently selected range image. However, if desired an optional ground plane segmentation refinement technique can be employed first to ensure each projected region represents only a single person or object. Once the location of each person or object of interest has been established, they can be tracked by analyzing subsequently generated range images.

70 Claims, 3 Drawing Sheets

OTHER PUBLICATIONS

C. Eveland, K. Konolige and R. C. Bolles. Background modeling for segmentation of video-rate stereo sequences. In Proceedings of the IEEE Conference on Computer Vision and Pattern Recognition, p. 226, 1998.

I. Haritaoglu, D. Harwood and L. Davis. W4S: A real-time system for detecting and tracking people in 2½D. Image and Vision Computing Journal, Jan. 1999.

T. Darrell, G. Gordon, M. Harville and J. Woodfill. Integrated person tracking using stereo, color, and pattern detection. In Proceedings of the IEEE Conference on Computer Vision and Pattern Recognition, p. 601–609, Santa Barbara, Jun. 1998. IEEE.

K. Toyama, J Krumm, B Brumitt and B Meyers, Wallflower: Principals and Practices of Background Maintenance. Proceedings of the Seventh International Conference on Computer Vision. 1999, p. 255–261.

* cited by examiner

SYSTEM AND PROCESS FOR LOCATING AND TRACKING A PERSON OR OBJECT IN A SCENE USING A SERIES OF RANGE IMAGES

BACKGROUND

1. Technical Field

The invention is related to system and process for locating and tracking people and non-stationary objects of interest in a scene, and more particularly, to such a system and process that employs a series of range images of the scene taken over time.

2. Background Art

Most current systems for determining the presence of persons or objects of interest in an image of a scene have involved the use of a sequence of pixel intensity-based images or intensity images for short. For example, a temporal sequence of color images of a scene is often employed for this purpose [1].

Persons or objects are typically recognized and tracked in these systems based on motion detected by one of three methods—namely by background subtraction [2], by adaptive template correlation, or by tracking color contour models [3, 4].

While the aforementioned locating methods are useful, they do have limitations. For example, the use of intensity images results in the presence of background "clutter" that significantly affects the reliability and robustness of these techniques. In addition, the adaptive templates employed in the adaptive template correlation techniques tend to drift as they pick up strong edges or other features from the background, and color contour tracking techniques are susceptible to degradation by intensity gradients in the background near the contour. Further, the image differencing methods typically used in the foregoing techniques are sensitive to shadows, change in lighting conditions or camera gain, and micro-motions between images. As a result, discrimination of foreground from background is difficult.

More recently, the use of sequential range images of the scene has been introduced into systems for locating persons and objects, and for tracking their movements on a real time basis [5, 6, 7]. In general, the advantage of using range images over intensity images is that the range information can be used to discriminate the three-dimensional shape of objects, which can be useful in both locating and tracking. For example, occluding surfaces can be found and dealt with as the tracked object moves behind them. Recognizing objects is also easier, since the actual size of the object, rather than its image size, can be used for matching. Further, tracking using range information presents fewer problems for segmentation, since range information is relatively unaffected by lighting conditions or extraneous motion.

While the locating and tracking systems employing range information can provide superior performance in comparison to systems employing only intensity images, there is still considerable room for improvement. For example, the aforementioned systems use range information typically for background subtraction purposes, but rely mostly on intensity image information to locate individual people or objects in the scene being analyzed. This can result in poor discriminatory ability when two people or objects are close together in the scene.

The system and process according to the present invention resolves the deficiencies of current locating and tracking systems employing range information.

It is noted that in the preceding paragraphs, the description refers to various individual publications identified by a numeric designator contained within a pair of brackets. For example, such a reference may be identified by reciting, "reference [1]" or simply "[1]". Multiple references are identified by a pair of brackets containing more than one designator, for example, [5, 6, 7]. A listing of the publications corresponding to each designator can be found at the end of the Detailed Description section.

SUMMARY

The present invention involves a technique for locating and tracking people and non-stationary objects of interest in a scene using a series of range images of the scene taken over time. In regards to locating people and objects, the technique generally entail first generating the series of range images. Preferably, the series of range images is a continuous temporal sequence of depth maps of the scene, such as might be captured using a video-rate stereo imaging system or a laser range finder system. A background model is computed from a block of these range images. In general, this entails identifying pixel locations in the block of range images that have reliable depth values.

Once the background model has been computed, a range image generated subsequent to the aforementioned block of range images is selected for processing. Preferably, this entails selecting the very next range image generated following the last image of the block used to compute the background model. The background is subtracted from this currently selected range image based on the background model to produce a foreground image. Generally, this involves identifying those pixels representing non-static portions of the scene depicted in the selected range image based on the background model. These "non-static" pixels are collectively designated as the foreground image.

At this point, an optional procedure can be employed to connect regions associated with the same person or object that may have become separated by gaps in the preceding background subtraction. To accomplish this, a standard morphologically growing and shrinking technique can be implemented. Essentially, this involves using the technique to first grow the foreground image, and then shrink it, in such a way that pixels in the gaps between related regions are added to the foreground image when pixels in the vicinity of the gap exhibit similar depth values. This connects the regions. If, however, the pixels in the vicinity of the gap do not exhibit similar depth values, this is an indication they belong to a different person or object. In that case, the pixels in the gap are not added to the foreground image and the regions remain separated.

The foreground image is next segmented into regions, each of which represents a different person or object of interest in the scene captured by the currently selected range image. This is essentially accomplished by identifying regions in the foreground image made up of pixels exhibiting smoothly varying depth values. In addition, any region having an actual area too small to represent a person or object of interest is eliminated from further consideration as foreground pixels.

If it is not only desired to locate a person or object in the scene, but to determine their identity as well, the following optional procedure can be adopted. This optional procedure determines the identity of the person or object associated with each segmented region in the foreground image by capturing an intensity image of the scene simultaneously with the generation of the aforementioned currently selected range image. Each region of the intensity image that corresponds to a segmented region in the foreground image can then be identified and used to determine the identity of the person or object represented by that region. It is noted that while the optional identification process can be performed immediately after the foreground image segmentation procedure, it can be even more advantageous to wait until after an optional ground plane segmentation procedure that will be described shortly. In either case, the identification process generally entails first characterizing the identified region in a way similar to a series of previously stored intensity images of known persons and objects. For example, the identified region and stored images might be characterized via a color histogram technique. The characterized region is compared to each of the stored characterizations, and the degree of similarity between each of them is assessed. If the degree of similarity between the identified region and one of the stored characterizations exceeds a prescribed level, the person or object represented by the identified region is designated to be the person or object associated with that stored characterization.

Regardless of whether the segmented foreground image is used to assist in the identification of the people and objects in the scene being analyzed, the locating process continues by projecting the segmented regions of the foreground image onto a ground plane of the scene. This generally involves first computing the bounds of the ground plane for the scene depicted in the currently selected range image. It is noted that the computation of the ground plane boundary need only be performed once, and can be used unchanged with each subsequent range image. Next, the vertical, horizontal and depth coordinates of each pixel in each segmented region are identified and adjusted to compensate for any camera roll and pitch. The pixels are then projected onto the ground plane.

Ground plane coordinates determined in the projection procedure can be used to designate the location of each separate person or object of interest in the scene captured by the currently selected range image. Typically, the coordinates of the projection of the mean location of all pixels contributing to a given person or object, projected into the ground plane, is used to specify this location. However, it is preferred that an optional ground plane segmentation refinement technique be employed first to ensure each projected region represents only a single person or object. This is essentially accomplished by cordoning off the projected foreground image so as to divide each projected region into a series of cells. One or more peak cells is identified in each projected region. This is done by ascertaining which cells contain the greatest number of pixels in comparison to neighboring cells within a prescribed radius, as well as having a pixel density that exceeds a prescribed threshold. The threshold is indicative of the pixel density expected in a cell containing pixels representing a person or object of interest. For each peak cell identified, the regions contributing pixels to any neighboring cell within a prescribed radius of the peak cell are conglomerated with the peak cell. If any of the regions previously defined in the foreground image segmentation procedure have contributed pixels to more than one of the computed conglomerations, then it is likely there are two or more people or objects associated with that region. Accordingly, the region should be divided. The division is accomplished by reassigning the pixels in the aforementioned region to one or more of the computed conglomerations, depending on how many of the conglomerations the region contributed pixels to in the previous conglomeration process. Preferably, this reassignment is done by determining which peak cell is closest to each pixel of the region under consideration, and assigning it to the conglomeration associated with that peak cell. The newly defined conglomerations represent the ground plane segmented regions, each of which should now be associated with only one person or object.

As mentioned previously the optional identification procedure would preferably be performed at this point whenever the ground plane segmentation is employed to redefine the segmented regions. It is believed a more accurate identification of the people and objects represented by the redefined regions can be obtained by waiting until the ground plane segmentation is complete. Essentially, the identification process is the same as described above, except that the segmented ground plane regions are first projected back into the image plane of the foreground image, via conventional methods, before being used for identification purposes.

Once the location of each person or object of interest has been established, they can be tracked by analyzing subsequently generated range images. In simple terms, a range image generated subsequent to the previously selected range image is selected and designated as the currently selected range image. The foregoing location technique is then repeated beginning with the background subtraction procedure. Preferably, the newly selected range image is the image generated immediately following the previously selected range image. The tracking process continues by selecting the next range generated, and the next, and so on for as long as it is desired to monitor the location of a person or object in the scene.

It is noted that the above tracking procedure uses the same background model to analyze each subsequently generated range image. However, a new background model can also be computed for each new range image analyzed if desired. This is accomplished by re-computing the background model from a block of range images made up of a prescribed number of the images generated immediately preceding the currently selected range image. The rest of the process remains the same. Alternatively, other conventional background-image adaptation schemes may be used to update the background model in an ongoing fashion.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
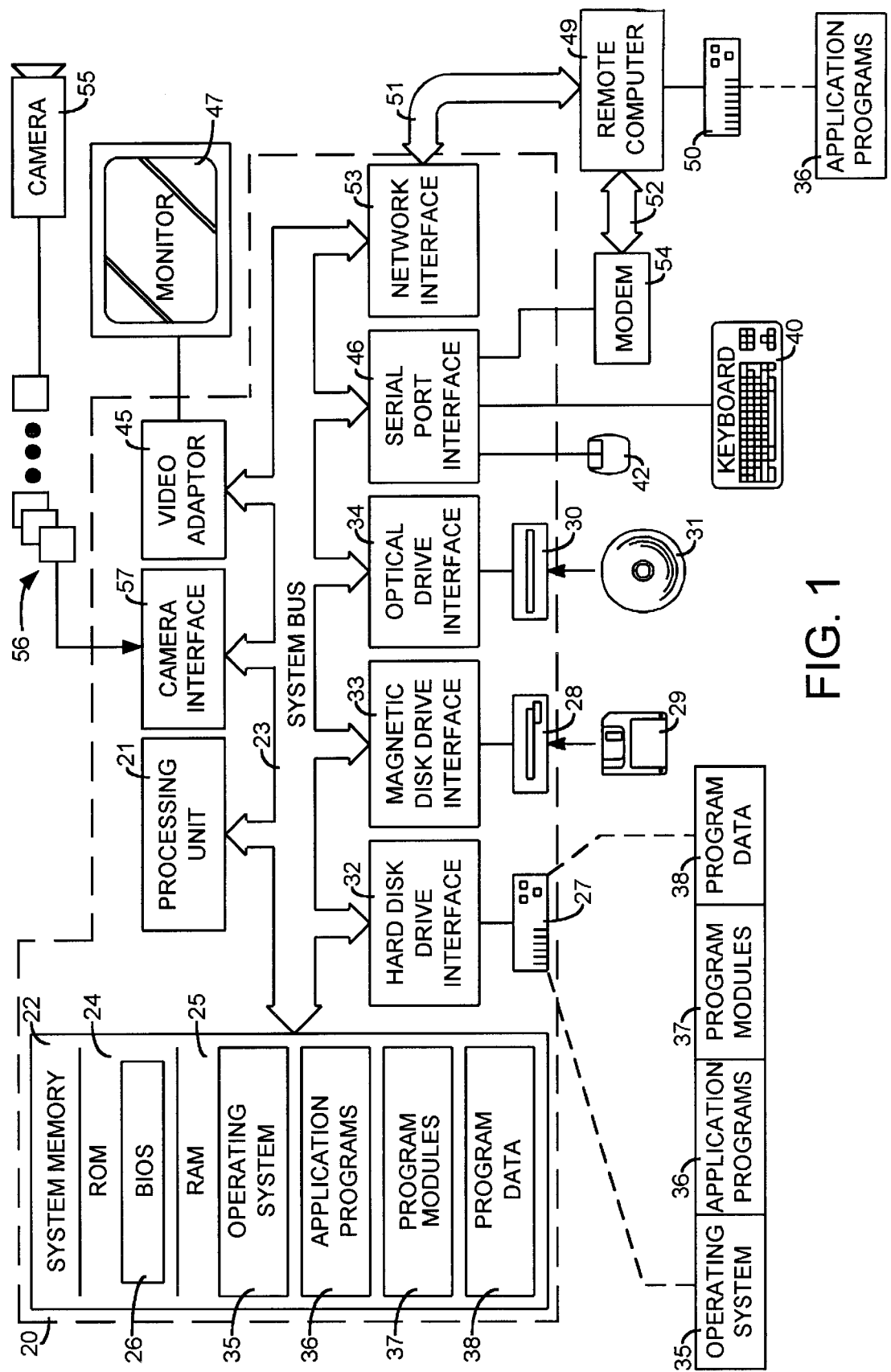
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port or a universal serial bus (USB). A monitor 47 or other type of display device is also connected to the system bus 23 via an interface, such as a video adapter 45. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description will be devoted to a description of the program modules and process embodying the present invention. The program modules associated with the location process will be described first in reference to FIG. 2. Then, the location process itself will be described with reference to FIG. 3.

1.0 Object Locator System Program Modules

Figure 2:
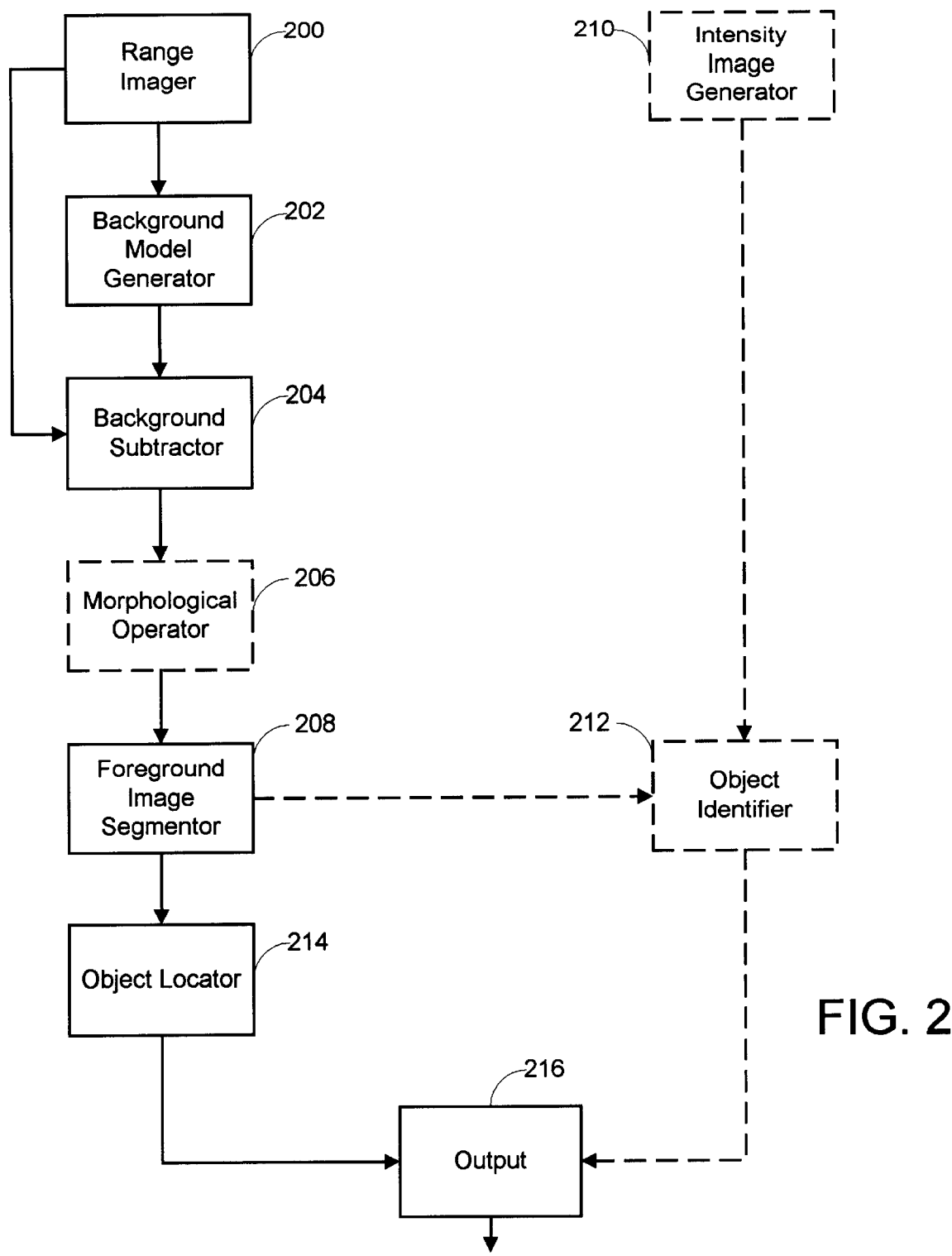
FIG. 2 is a diagram depicting the program modules employed for a locating and tracking system according to the present invention.

The present system for locating and tracking people and objects in a scene is based on the program modules depicted in FIG. 2. The scene is imaged by a depth imager module 200. As will be discussed in detail later, this imager module 200 outputs range images representative of the scene being searched for people or non-stationary objects of interest. The range image output is provided to both a background model generator module 202 and a background subtractor module 204. The background model generator 204 produces a background model from a block of sequential range images provided by the depth imager module 200. This background model is provided to the background subtractor module 204, where it is used to subtract the background from a subsequently produced range image provided to the subtractor module from the depth imager 200. As will be discussed in connection with the location process, the result of this subtraction is a foreground image representing the people or objects of interest in the scene. The foreground image is optionally provided to a morphological operator module 206 which processes it to connect related regions of a person or object that became separated in the foreground image during the aforementioned subtraction. It is noted that the morphological operator module 206 is depicted in FIG. 2 by a dashed line box. The dashed lines are used to indicate the optional nature of the module, as they are throughout the drawings to indicate optional elements.

Regardless of whether the morphological operator module 206 is included, or not, the foreground image is provided to a foreground image segmentor module 208. The segmentor module 208 is used to designate regions within the foreground image that correspond to a person or object of interest.

To this point all the described program modules are designed to determine the location of a person or object in a scene. However, this system could be employed with an identification system designed to determine the identify of a person or object in the scene. If so, the optional modules depicted on the right-hand side FIG. 2 come into play. Specifically, an optional intensity image generator 210, which creates intensity images of the same scene contemporaneously with the aforementioned range images, is employed. These intensity images are provided to an optional object identifier module 212, which is also provided with the segmented foreground image from the segmentor module 208. As will be described in greater detail later, the object identifier module 212 uses the segmented foreground image and a contemporaneous intensity image of the scene to identify people and objects.

The segmented foreground image is also provided to an object locator module 214. This locator module 214 is used to determine the location of people and objects of interest in relation to a ground plane of the scene. This location information is then passed to an output module 216 for use by other systems. Additionally, if an identification system is teamed with the present locator system, the identity information from the object identifier module 212 is also passed to the output module 216 and made available for use by other systems.

2.0 Location Process

The above-described object locator system program modules are employed to locate people and non-stationary objects of interest in a scene using the location process that will now be described. This location process is depicted in the flow diagram of FIG. 3 as a series of process actions. The following sub-sections describe each of these actions and exemplary methods for accomplishing them.

2.1 Range Image Creation.

Figure 3:
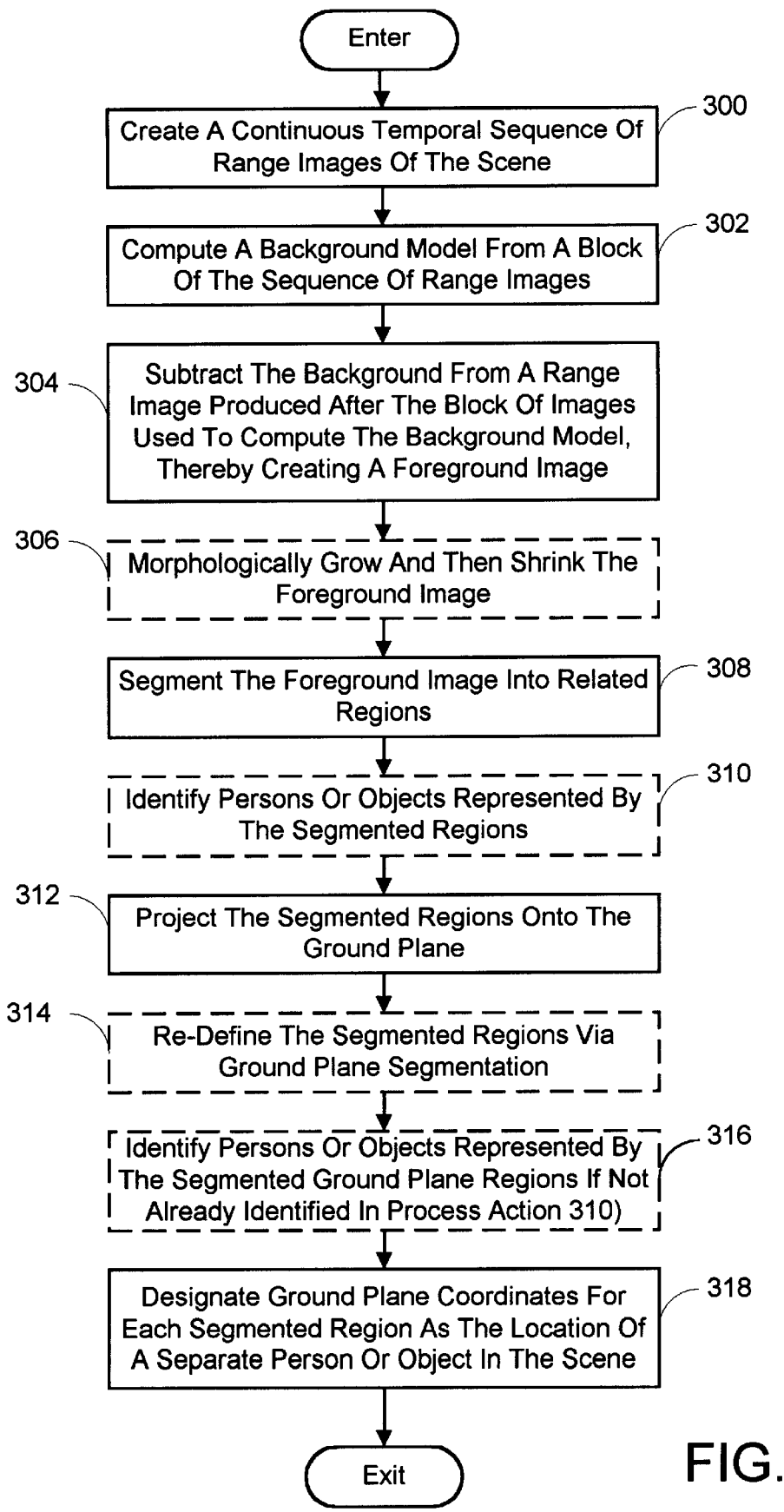
FIG. 3 is a block diagram of a process for locating persons and objects in a scene according to the present invention.

The present location process uses a series of range images to locate persons or other non-stationary objects of interest in a scene captured by the images. Referring to FIG. 3, these range images preferably take the form of a continuous temporal sequence of depth maps created from stereo images taken of a scene with an appropriate camera at a fixed position (process action 300). For example, the aforementioned video-rate stereo systems would be appropriate for providing the desired stereo images used to create the sequence of depth maps. However, other devices could also be employed to create the desired range images, such as a laser range finder system. Regardless of how they are obtained, these images essentially identify how far away objects are from the camera.

It is noted that some of the calculations required to accomplish the process actions of the location process, which will be described in the sub-sections to follow, employ disparity values, rather than depth values. However, these disparity values are readily extracted from the depth values associated with each pixel of the range image via the following formula:

$$d = K/x \quad (1)$$

where d is the disparity, x is the normal distance from the image plane to the object, and K is a constant related to both the internal parameters of the camera used to capture the images and the particular parameters of the software which computes depth from images (typically using a correlation-based stereo technique). Further, the disparity values are quantized in that only a prescribed number of disparity ranges or levels (which are also often just referred to as disparities) are actually used. To this end, each pixel is assigned to the disparity level into which its actual disparity value falls.

In a tested embodiment, 320×240 range images, generated via correlation based stereo from triplets of intensity images, taken by cameras with a 10 cm baseline, are used. Typically, 20–30 disparity levels are used. In the description of the preferred embodiments of the invention that are to follow the use of range images produced in the foregoing way will be presumed and any preferred parameters identified in the description will be based on the use of these types of range images. If other types of range images are employed with the present invention, these preferred parameters may have to be adjusted. However, such adjustments can be readily determined via conventional means by those skilled in the art based on the type of range image employed, and so will not be discuss in detail in the present description.

2.2 Background Model Computation.

The location process uses a background subtraction methodology to detect objects of interest in the scene. Background subtraction typically requires the generation of a background model or image during a training phase, which is then utilized during subsequent operations to detect changes in the scene. Many processes exist for accomplishing this task, any of which could be employed. For example, a background model can be computed from a block of the sequential range images (process action 302), as follows. A prescribed number of sequential range images are selected for use in generating a background model. For example, in a tested embodiment of the present invention, a block of 30 images was selected. The depth and the square of the depth are summed at each corresponding pixel location in the sequence of depth images. A corresponding pixel location between images is one representing the same portion of the scene. Additionally, for each corresponding pixel location, the number of valid pixels is recorded. A valid pixel is one in which an actual depth value is available. In the aforementioned process of creating depth maps, the distance from the camera to a portion of the object depicted by the pixel is sometimes inconclusive. In these cases, the pixel will not have a depth value associated with it and so will be deemed invalid for the purposes of the foregoing calculations.

Next, a mean is computed for each pixel location by dividing the sum of the pixel depths associated with the location by the number of valid pixels at that location. In addition, the variance is computed for each pixel location by subtracting the square of the mean computed for the location from the sum of the squares of the pixel depths at that location, divided by the square of the number of valid pixels associated with the location. The square root of this variance is the standard deviation. It is noted that in the above calculations, a valid pixel location is defined as one where at least 25% of the pixels used to compute the sums had valid disparity values. In addition, even if more than 25% of the pixels had valid disparity values, the pixel location is declared invalid if it is determined the standard deviation for that location is greater than 3 disparity levels. Thus, each pixel location in the background model is now either marked as invalid, or has a mean and standard deviation associated therewith derived from the depths observed at that pixel location in the block of the sequential range images.

2.3 Background Subtraction.

Once the background model has been computed, it is used to subtract the background from a range image produced after the block of images used to compute the background model (process action 304). Preferably, this would be the very next range image produced (e.g., the $31^{st}$ image in the aforementioned tested embodiment). What remains after the subtraction process is designated as a foreground image. The preferred background subtraction process involves comparing pixels in the newly inputted range image to corresponding pixel locations in the background model. If an input image pixel does not have a valid disparity value at a particular pixel location, then regardless of the background pixel value, it is set to a zero depth value. Further, if the absolute difference between the depth value of a pixel in the input image and the mean computed for the corresponding pixel in the background model is less than a prescribed multiple of the previously calculated standard deviation for that pixel location, then it is also zero'ed. In all other cases, the disparity value of the input image pixel is left intact— even if the pixel location was deemed invalid in the background model. The aforementioned prescribed multiple can range from about 1.5 to about 3.0, with a multiple of 2.0 being preferred. Essentially, every pixel that has a disparity value greater than zero after the subtraction process is considered a foreground pixel. These pixels collectively constitute the aforementioned foreground image.

2.4 Morphological Growing and Shrinking Option.

Once the background has been subtracted, the foreground image produced can be optionally processed to connect regions that likely belong to the same person or object, but which are slightly separated in the image—for example, because the pixels that would have connected the regions were zero'ed in the background subtraction process. It is believed that performing this optional process action will improve the results of the foreground segmentation process to be discussed next. To connect these related regions, a morphological growing and shrinking operation is performed on the foreground image (process action 306). The goal of this operation is to bridge the gaps in related regions based on the depth values of pixels in the vicinity of the gap, while at the same time not connecting unrelated regions as indicated by their disparate depths. Here again many existing procedures could be employed to accomplish the task at hand. However, as an example, the following process could be used. This process is based on a "4-connected" scheme, meaning that each non-edge pixel is considered to have four neighbors (i.e., up, down, left & right). In the growing phase of the process, each background pixel .(which has a zero depth value) is compared to its four neighbors. If two or more of these neighbors are within one disparity level of each other (and have a non-zero disparity, i.e. are part of the foreground image), then the former background pixel is assigned a disparity level equal to the rounded down average of the disparities of the neighboring pixels found to be within one disparity level of each other. The foregoing growing process is then repeated a prescribed number of times (e.g., six to eight times in a tested embodiment). In the shrinking phase of the process, each non-zero pixel (i.e., current foreground pixel) is compared to its four neighbors. If at least three of these neighbors do not have disparities within one disparity value of each other, then the pixel is zero'ed and so made background. This shrinking process is then also repeated a prescribed number of times (e.g., six to eight times).

The growing and shrinking phases tend to add foreground pixels between regions having similar depths, while not doing so between regions having dissimilar depths. The result is that at least slightly separated, related regions become connected in the foreground image.

2.5 Foreground Image Segmentation.

The next process action entails segmenting the foreground image to identify the location of related components or regions in the image (process action 308). Here again many existing segmentation programs could be employed for this purpose. However, it is preferred that the following process be used. The goal of the preferred process is to identify regions having smoothly varying depth values. To accomplish this an initial labeling process action is performed in which a pass is made over a disparity image derived from the foreground image via Equation (1). This pass, which is made in a left to right, top to bottom fashion, produces a region map image that maps pixels to regions. Specifically, as the disparity image is traversed, each non-zero disparity pixel is compared to its two neighbors to the immediate left and immediately above. If both of those neighbors have a zero disparity level, then the pixel is assigned to a new, consecutively numbered, region in a lookup table created to keep track of the pixel-to-region assignments. If the disparity pixel is within one disparity from either of the neighbors then it is assigned to the same region as that neighbor in the table. In addition, if the current pixel is within one disparity of both neighbors and they are in different regions then these regions are deemed to have "collided" and a notation is made in the table for the pixel location that the two adjoining regions should be merged. In this case, the pixel in question can be given either label.

Once the first, labeling pass is complete, a second pass is made over the newly created region map. The purpose of this second pass is to update the pixel-to-region assignments in the look-up table so that all the pixels in two regions that have "collided" are assigned to the same region. This is done by re-assigning all the pixels assigned to the "collided" higher numbered region to the lower numbered region. It is noted that if any of the resulting merged regions contain fewer than a prescribed number of pixels or represent an object having a physical area below a prescribed minimum, they are preferably eliminated (i.e., zero'ed). The term physical area is used to mean the actual area of the object depicted in the image. This area is determined via conventional means by using both the number of pixels making up the region and the depth values associated with the pixels of that region. The number of pixels and the depth values are used because, for example, a small object that is of little interest may be very close to the camera and so have a large number of pixels associated with it, but also very small depth values. This is compared to say a relatively large object that is of interest (e.g., a person) but which is very far away from the camera thereby being depicted by relatively few pixels, but all with large depth values.

2.6. Identification Option.

At this point in the location process, it is possible to identify persons or objects represented by the segmented regions (process action 310)—if this is a desired part of the application for which the present location process is being employed. The identification process actions can take one of two paths. If an image of a person or object to be identified has been previously characterized in some manner, then this characterization can be compared to a similar characterization of portions of an image of the scene corresponding to the location of each of the segmented foreground regions to assess a match. However, if there has been no previous characterization, or no match is found, but it is known a particular segmented region corresponds to a person or object that it is desired to track within the scene, then the aforementioned characterization can be performed using a current image of the scene and the location information provided by the segmented region image created in the last process action of the location process. This new characterization would then be stored for future identifications. Any appropriate image characterization process designed to identify a person in an image can be employed for these identification process actions. However, it is preferred that the unique color histogram identification processes described in a co-pending application assigned to the common assignee hereto and entitled OBJECT RECOGNITION SYSTEM AND PROCESS FOR IDENTIFYING PEOPLE AND OBJECTS IN AN IMAGE OF A SCENE, be employed. This co-pending application was filed on Nov. 23, 1999 and assigned Ser. No. 09/448,616

While the above-described identification procedure can be performed at this point in the location process if desired, it may be more beneficial to wait until after an optional ground plane segmentation procedure. This optional ground plane segmentation procedure, which will be described shortly, is intended to produce a more accurate assignment of pixels among the various people and objects in the scene, and so could result in a more accurate identification of these people and objects. Thus, when the ground plane segmentation procedure is employed, it is preferred that the identification procedure be delayed until after the ground plane segmentation is complete.

2.7 Ground Plane Projection.

Regardless of whether the aforementioned identification procedure is incorporated into the present location process, or not, the next process action 312 in the location process is to project the segmented regions onto a ground plane. This is done as part of a procedure to identify where in the scene with respect to the ground plane a foreground region resides. The projection process begins by computing the possible space onto which the pixels associated with the segmented regions can be projected. This is done by first computing the boundaries of the ground plane of the scene depicted in the range image currently under consideration. Specifically, the minimum and maximum depths associated with pixels in certain prescribed regions of the depth image are identified. For example, the minimum and maximum depth of a group of pixels in each corner of the depth image could be used. Regions approximately half way between the corners along each edge of the image could also be included. These minimum and maximum depths are used via conventional methods to define the ground plane boundaries of the scene. It is noted that the computation of the ground plane boundaries need only be performed once and can be employed in the ground plane segmentation procedure associated with finding people and objects in subsequently generated range images of the same scene.

Once the ground plane boundaries have been established, each pixel in each segmented region is projected onto the plane by using its pixel row, pixel column and disparity to compute an X,Y,Z location for that pixel in space via conventional methods. This location is then rotated to account for the roll and pitch of the camera, and the y-coordinate is thrown away to produce a X,Z location of the pixel on the ground plane. This X,Z data provides a convenient way to define the location of an object or person in the scene. For example, the coordinates of the projection of the mean location of all pixels contributing to a given person or object, projected into the ground plane, could be used to specify the location of the person or object in the scene.

Optionally, to speed processing, instead of projecting all pixels, the foreground image can be divided into square blocks, typically 5 pixels on a side. Any block which contains pixels belonging only to one region is projected into the ground plane, using the middle pixel of that block. This results in a loss of spatial resolution, but a significant speedup in processing. All the other process actions remain the same, though the prescribed radius parameters the be described next in connection with the optional Ground Plane Segmentation procedure would have to be adjusted to account for a smaller number of projected pixels.

2.8 Ground Plane Segmentation Option.

The next process action in the location process is an optional ground plane segmentation (process action 314). This is a refinement process action that re-visits the question of which pixels belong to which of the foreground objects. For example, in the foregoing segmentation process action, it is possible that two persons in a room who are very close together or touching might be perceived as a single region. The ground plane segmentation process action can be employed to remedy this situation. While any appropriate ground plane segmentation method can be used, it is preferred that the following process be employed. Specifically, the preferred process involves dividing the ground plane into a grid with cells that are sized to be no larger than the space an object of interest or person might occupy on the ground plane. In the case of a person this space is the area a person would occupy when standing or sitting (the situation where a person is lying down is ignored in this part of the analysis). However, preferably, the actual cell size would be about 4 to 16 times smaller than the area expected to be occupied by the object of person.

Once the grid is established, a count is made of every pixel belonging to a. particular region whose X,Z coordinates fall within a particular cell of the ground plane grid. If pixels from two different regions fall inside the same cell, a count of each is maintained separately. Recall that each foreground image pixel was assigned a region during the aforementioned segmentation step. The count values are used to identify which cells contain a number of pixels associated with a particular region that both exceed a prescribed threshold number and represent a local maximum when compared neighboring cells within a prescribed radius. The threshold is chosen such that a person or object of interest in the room whose location corresponds to a cell would produce a pixel count in the cell that exceeds the threshold. In a tested embodiment of the present invention, the aforementioned prescribed radius used in identifying a peak cell was 2 pixels. The cells meeting the aforementioned requirements are referred to as "peak" cells.

For each peak cell in turn, all the regions which contributed to cells within a bounded radius of cells from that peak cell (e.g., 3 pixels) are conglomerated into a single region. Thus, each peak cell has a conglomeration, comprised of a list of contributing regions. If any region [as specified in the previous foreground image segmentation procedure] has contributed pixels to more than one of the computed conglomerations, then this is an indication that there are two or more people or objects and that the region which is contributing to two or more conglomerations should be divided. The division or segmentation is accomplished by reassigning the pixels of the shared region to one or more of the conglomerations (depending on the number of conglomerated regions the shared region contributed pixels to in the conglomeration process). Preferably, this is done by determining which peak cell is closest to each pixel, and then reassigning each pixel to the conglomeration associated with the closest peak cell. The newly defined conglomerations represent the ground plane segmented regions, each of which should now be associated with only one person or object As discussed previously, if the foregoing ground plane segmentation process is employed, the aforementioned optional identification process would preferably be performed after this segmentation (process action 316), rather than after the previously-described foreground image segmentation procedure. To accomplish this, the segmented regions of the ground plane would be first projected back into the image plane of the foreground image via conventional methods. The identification process then proceeds as described previously.

2.9 Identification of Ground Plane Coordinates for each Segmented Region.

The final process action 318 in the location process is to designate the previously identified ground plane coordinates of each pixel in each of the segmented regions as the location of a part of a separate person or object in the scene.

This designation, of course, only defines the location of persons or objects of interest at the time the range image used to determine it was captured. If it is desired to track the movements of the person or non-stationary object within the scene, then the foregoing location process actions would be repeated using subsequently generated range images. New location data would be determined for each of the subsequent range images processed. Preferably, the location process would be repeated for each subsequent range image produced.

Further, it is noted that the same background model could be employed each time, such that only process actions 302 through 318 would be repeated for each location process iteration. However, it is preferred that the background model be re-computed for each iteration as well. This would be accomplished by employing the number of immediately preceding range images produced which equal to the aforementioned prescribed number (e.g., the immediately preceding 30 range images produced would be employed). Alternatively, other conventional background-image adaptation schemes such as those described in reference [8] may be used to update the background in an ongoing fashion.

References

[1] C. Wren, A. Azarbayejani, T. Darrell and A. Pentland. Pfinder: Real-time tracking of the human body. In *IEEE Transactions on Pattern Analysis and Machine Intelligence*, July 1997, Vol. 19, No. 7, pages 780–785.

[2] I. Haritaoglu, D. Harwood and L. Davis. W4—Real-time detection and tracking of people and their parts. *University of Maryland technical report*, August 1997.

[3] M. Isard and A. Blake. Contour tracking by stochastic propagation of conditional density. *Proc. ECCV* 1996.

[4] S. Rowe and A. Blake. Statistical mosaics for tracking. *J Image and Vision Computing*, 14(8), 1996.

[5] C. Eveland, K. Konolige and R. C. Bolles. Background modeling for segmentation of video-rate stereo sequences. In *Proceedings of the IEEE Conference on Computer Vision and Pattern Recognition*, page 226, 1998.

[6] I. Haritaoglu, D. Harwood and L. Davis. $W^4S$: A real-time system for detecting and tracking people in 2½D. *Image and Vision Computing Journal*, January 1999.

[7] T. Darrell, G. Gordon, M. Harville and J. Woodfill. Integrated person tracking using stereo, color, and pattern detection. In *Proceedings of the IEEE Conference on Computer Vision and Pattern Recognition*, page 601–609, Santa Barbara, June 1998. IEEE.

[8] K. Toyama, J Krumm, B Brumitt and B Meyers, Wallflower: Principals and Practices of Background Maintenance. Proceedings of the Seventh International Conference on Computer Vision. 1999, page 255–261.

What is claimed is:

1. A computer-implemented process for locating persons and objects in a scene, said process comprising using a computer to perform the following acts:

(a) generating a series of range images of the scene over time;

(b) computing a background model using only range information from a block of said range images;

(c) selecting a range image generated subsequent to said block of range images;

(d) subtracting the background from the currently selected range image using the background model to produce a foreground image;

(e) segmenting the foreground image into at least one region, wherein each region represents a different person or object of interest in the scene captured by the currently selected range image;

(f) projecting the segmented regions of the foreground image onto a ground plane of the scene to produce segmented ground plane regions; and (g) designating ground plane coordinates associated with each of the segmented ground plane regions as the location of a separate person or object of interest in the scene captured by the currently selected range image.

2. The process of claim 1, wherein the act of generating the series of range images, comprises the act of generating a continuous temporal sequence of depth maps of the scene.

3. The process of claim 1, wherein the act of computing the background model, comprises the act of computing the background model from a block of range images comprising a prescribed number of temporally sequential range images.

4. The process of claim 1, wherein the act of computing the background model, comprises the acts of:

identifying, in a block of said range images, pixels locations having reliable depth values.

5. The process of claim 1, wherein the act of subtracting the background, comprises the acts of:

identifying pixels representing non-static portions of the scene depicted in the selected range image;

collectively designating the pixels representing the non-static portions of the scene as the foreground image.

6. The process of claim 1, wherein the act of selecting a range image generated subsequent to said block of range images, comprises the act of selecting the next range image generated following the last range image of said block of range images used to compute the background model.

7. The process of claim 1, wherein the act of segmenting the foreground image, comprises the act of identifying regions in the foreground image comprising pixels exhibiting smoothly varying depth values.

8. The process of claim 7, wherein the act of segmenting the foreground image, comprises the act of eliminating any region having an actual area too small to represent a person or object of interest in the scene.

9. The process of claim 1, wherein the act of projecting the segmented regions of the foreground image onto the ground plane of the scene, comprises the acts of:
   computing ground plane boundaries for the scene depicted in the selected range image;
   identifying vertical, horizontal and depth coordinates of each pixel in each segmented region;
   adjusting the identified pixel coordinates to compensate for camera roll and pitch; and
   projecting each pixel onto the ground plane.

10. The process of claim 1, further comprising performing the acts of:
    selecting at least one range image generated subsequent to said previously selected range image;
    designating, in turn, each newly selected range image as the currently selected range image in the sequence in which each was generated; and
    repeating acts (d) through (g) in turn for each currently selected range image.

11. The process of claim 10, wherein the act of selecting at least one range image generated subsequent to said previously selected range image, comprises the act of selecting each range image such that it is an image generated immediately following the previously selected range image.

12. The process of claim 1, further comprising performing the acts of:
    selecting at least one range image generated subsequent to said previously selected range image;
    designating, in turn, each newly selected range image as the currently selected range image in the sequence in which each was generated;
    for each currently selected range image in turn, re-computing the background model; and
    repeating acts (d) through (g) in turn for each currently selected range image using its associated background model.

13. The process of claim 12, wherein the act of selecting at least one range image generated subsequent to said previously selected range image, comprises the act of selecting each range image such that it is an image generated immediately following a previously selected range image.

14. The process of claim 1, further comprising, prior to performing the segmentation action, performing the act of morphologically growing and then shrinking the foreground image so as to connect separated regions associated with the same person or object.

15. The process of claim 14, wherein the act of morphologically growing and shrinking the foreground image, comprises the act of adding pixels in gaps between regions to the foreground image only when pixels in the vicinity of the gap exhibit similar depth values.

16. The process of claim 1, further comprising the act of determining the identity of a person or object associated with a segmented region in the foreground image.

17. The process of claim 16, wherein the act of determining the identity of a person or object associated with a segmented region in the foreground image, comprises the acts of:
    capturing an intensity image of the scene contemporaneously with the generation of the currently selected range image;
    identifying a region of said intensity image that corresponds in location within the scene to the segmented region in the foreground image;
    employing the identified region to determine the identity of the person or object represented by that region.

18. The process of claim 17, wherein the act of employing the identified region to determine the identity of the person or object represented by that region, comprises the acts of:
    characterizing the identified region in a way similar to a series of stored intensity-based images of known persons and objects that are to be identified in said captured intensity image of the scene;
    comparing the characterized identified region to each of the stored, similarly characterized images;
    assessing the degree of similarity between the compared region and each image; and
    whenever a prescribed degree of similarity exists between the identified region and one of the stored images, designating the person or object represented by the identified region to be the person or object associated with that stored image.

19. The process of claim 17, wherein the intensity image of the scene is a color image.

20. The process of claim 1, further comprising the act of refining the segmentation of a projected region prior to designating its ground plane coordinates so as to ensure the projected region represents only a single person or object.

21. The process of claim 20, wherein the act of refining the segmentation of a projected region, comprises the acts of:
    cordoning the projected region into a series of cells;
    identifying one or more peak cells in the projected region, wherein a peak cell is one which contains the greatest number of pixels in comparison to neighboring cells located within a first prescribed radius of the cell and whose pixel density exceeds a prescribed threshold indicative of a density of pixels expected in a cell containing pixels representing a person or object of interest;
    for each peak cell identified, conglomerating the regions contributing pixels to the peak cell as well as neighboring cells located within a second prescribed radius from the peak cell;
    dividing any region contributing pixels to more than one conglomeration by reassigning each pixel of the region to the conglomeration associated with the closest peak cell to produce a revised conglomeration; and
    designating each revised conglomeration as a segmented ground plane region.

22. The process of claim 20, further comprising the act of determining the identity of a person or object associated with a segmented ground plane region.

23. A system for locating persons and objects in a scene, comprising:
    a general purpose computing device;

a computer program comprising program modules executable by the computing device, wherein the computing device is directed by the program modules of the computer program to:

generate a series of range images of the scene over time;

compute a background model using only range information from a block of said range images;

select a range image generated subsequent to said block of range images and designate it as the currently selected range image;

subtract the background from the currently selected range image using the background model to produce a foreground image;

segment the foreground image into at least one region, wherein each region represents a different person or object of interest in the scene captured by the currently selected range image;

project the segmented regions of the foreground image onto a ground plane of the scene to produce segmented ground plane regions; and determine the location of each segmented ground plane region by ascertaining its ground plane coordinates.

24. The system of claim 23, wherein the program module for generating the series of range images, comprises a sub-module for generating a continuous temporal sequence of depth maps of the scene.

25. The system of claim 23, wherein the program module for computing the background model, comprises a sub-module for computing the background model from a block of range images comprising a prescribed number of temporally sequential range images.

26. The system of claim 23, wherein the program module for computing the background model, comprises sub-modules for:

identifying, in a block of said range images, pixels locations having reliable depth values.

27. The system of claim 23, wherein the program module for subtracting the background model, comprises sub-modules for:

identifying pixels representing non-static portions of the scene depicted in the selected range image;

collectively designating the pixels representing the non-static portions of the scene as the foreground image.

28. The system of claim 23, wherein the program module for selecting a range image generated subsequent to said block of range images, comprises a sub-module for selecting the next range image generated following the last range image of said block of range images used to compute the background model.

29. The system of claim 23, wherein the program module for segmenting the foreground image, comprises a sub-module for identifying regions in the foreground image comprising pixels exhibiting smoothly varying depth values.

30. The system of claim 29, wherein the program module for segmenting the foreground image, comprises a sub-module for eliminating any region having an actual area too small to represent a person or object of interest in the scene.

31. The system of claim 23, wherein the program module for projecting the segmented regions of the foreground image onto the ground plane of the scene, comprises sub-modules for:

computing ground plane boundaries for the scene depicted in the selected range image;

identifying vertical, horizontal and depth coordinates of each pixel in each segmented region;

adjusting the identified pixel coordinates to compensate for camera roll and pitch; and projecting each pixel onto the ground.

32. The system of claim 23, further comprising program modules for:

(a) selecting a range image generated subsequent to the last previously selected range image;

(b) designating the newly selected range image as the currently selected range image;

(c) subtracting the background from a currently selected range image to produce a foreground image;

(d) segmenting the foreground image into at least one region, wherein each region represents a different person or object of interest in the scene captured by the currently selected range image;

(e) projecting the segmented regions of the foreground image onto a ground plane of the scene;

(f) designating the ground plane coordinates associated with each of the segmented foreground image regions as the location of a separate person or object of interest in the scene captured by the currently selected range image; and (g) repeating program modules (a) through (f) for as long as it is desired to track persons and objects in the scene.

33. The system of claim 32, wherein the program module for selecting a new range image generated subsequent to the last previously selected range image, comprises a sub-module for selecting the range image generated immediately following the last previously selected range image.

34. The system of claim 23, further comprising program modules for:

(a) selecting a range image generated subsequent to the last previously selected range image;

(b) designating the newly selected range image as the currently selected range image;

(c) re-computing the background model; and (d) subtracting the background from a currently selected range image to produce a foreground image;

(e) segmenting the foreground image into at least one region, wherein each region represents a different person or object of interest in the scene captured by the currently selected range image;

(f) projecting the segmented regions of the foreground image onto a ground plane of the scene;

(g) designating the ground plane coordinates associated with each of the segmented foreground image regions as the location of a separate person or object of interest in the scene captured by the currently selected range image; and (h) repeating program modules (a) through (g) for as long as it is desired to track persons and objects in the scene.

35. The system of claim 34, wherein the program module for selecting a range image generated subsequent to the last previously selected range image, comprises a sub-module for selecting the range image generated immediately following the last previously selected range image.

36. The system of claim 23, wherein the computer program further comprises a program module, executable prior to the execution of the program module for segmenting the foreground image, for morphologically growing and then shrinking the foreground image so as to connect separated regions associated with the same person or object.

37. The system of claim 36, wherein the program module for morphologically growing and shrinking the foreground image, comprises a sub-module for adding pixels in gaps between regions to the foreground image only when pixels in the vicinity of the gap exhibit similar depth values.

38. The system of claim 23, further comprising a program module for determining the identity of a person or object associated with a segmented region in the foreground image.

39. The system of claim 38, wherein the program module for determining the identity of a person or object associated with a segmented region in the foreground image, comprises sub-modules for:
    capturing an intensity image of the scene contemporaneously with the generation of the currently selected range image;
    identifying a region of said intensity image that corresponds in location within the scene to the segmented region in the foreground image;
    employing the identified region to determine the identity of the person or object represented by that region.

40. The system of claim 39, wherein the sub-module for employing the identified region to determine the identity of the person or object represented by that region, comprises sub-modules for:
    characterizing the identified region in a way similar to a series of stored intensity images of known persons and objects that are to be identified in said captured intensity-based image of the scene;
    comparing the characterized identified region to each of the stored, similarly characterized images;
    assessing the degree of similarity between the compared region and each image; and
    whenever a prescribed degree of similarity exists between the identified region and one of the stored images, designating the person or object represented by the identified region to be the person or object associated with that stored image.

41. The system of claim 39, wherein the intensity image of the scene is a color image.

42. The system of claim 23, further comprising a program module for refining the segmentation of a projected region prior to designating its ground plane coordinates so as to ensure the projected region represents only a single person or object.

43. The system of claim 42, wherein the program module for refining the segmentation of a projected region, comprises sub-modules for:
    cordoning the projected region into a series of cells;
    identifying one or more peak cells in the projected region, wherein a peak cell is one which contains the greatest number of pixels in comparison to neighboring cells located within a first prescribed radius of the cell and whose pixel density exceeds a prescribed threshold indicative of a density of pixels expected in a cell containing pixels representing a person or object of interest;
    for each peak cell identified, conglomerating the regions contributing pixels to the peak cell as well as neighboring cells located within a second prescribed radius from the peak cell;
    dividing any region contributing pixels to more than one conglomeration by reassigning each pixel of the region to the conglomeration associated with the closest peak cell to produce a revised conglomeration; and
    designating each revised conglomeration as a segmented ground plane region.

44. The system of claim 42, further comprising a program module for determining the identity of a person or object associated with a segmented ground plane region.

45. A computer-readable memory for locating persons and objects in a scene, comprising:
    a computer-readable storage medium; and
    a computer program comprising program modules stored in the storage medium, wherein the storage medium is so configured by the computer program that it causes the computer to:
        generate a series of range images of the scene over time;
        compute a background model using only range information from a block of said range images;
        select a range image generated subsequent to said block of range images and designate it as the currently selected range image;
        subtract the background from the currently selected range image using the background model to produce a foreground image;
        segment the foreground image into at least one region, wherein each region represents a different person or object of interest in the scene captured by the currently selected range image;
        project the segmented regions of the foreground image onto a ground plane of the scene to produce segmented ground plane regions; and
        designate the ground plane coordinates associated with each of the segmented ground plane regions as the location of a separate person or object of interest in the scene captured by the currently selected range image.

46. The computer-readable memory of claim 45, wherein the program module for generating the series of range images, comprises a sub-module for generating a continuous temporal sequence of depth maps of the scene.

47. The computer-readable memory of claim 45, wherein the program module for computing the background model, comprises a sub-module for computing the background model from a block of range images comprising a prescribed number of temporally sequential range images.

48. The computer-readable memory of claim 45, wherein the program module for computing the background model, comprises sub-modules for:
    identifying, in a block of said range images, pixels locations having reliable depth values.

49. The computer-readable memory of claim 45, wherein the program module for subtracting the background, comprises sub-modules for:
    identifying pixels representing non-static portions of the scene depicted in the selected range image;
    collectively designating the pixels representing the non-static portions of the scene as the foreground image.

50. The computer-readable memory of claim 45, wherein the program module for selecting a range image generated subsequent to said block of range images, comprises a sub-module for selecting the next range image generated following the last range image of said block of range images used to compute the background model.

51. The computer-readable memory of claim 45, wherein the program module for segmenting the foreground image, comprises a sub-module for identifying regions in the foreground image comprising pixels exhibiting smoothly varying depth values.

52. The computer-readable memory of claim 51, wherein the program module for segmenting the foreground image, comprises a sub-module for eliminating any region having an actual area too small to represent a person or object of interest in the scene.

53. The computer-readable memory of claim 45, wherein the program module for projecting the segmented regions of the foreground image onto the ground p lane of the scene, comprises sub-modules for:
 computing ground plane boundaries for the scene depicted in the selected range image;
 identifying vertical, horizontal and depth coordinates of each pixel in each segmented region;
 adjusting the identified pixel coordinates to compensate for camera roll and pitch; and
 projecting each pixel onto the ground plane.

54. The computer-readable memory of claim 45, further comprising program modules for:
 (a) selecting a range image generated subsequent to the last previously selected range image;
 (b) designating the newly selected range image as the currently selected range image;
 (c) subtracting the background from a currently selected range image to produce a foreground image;
 (d) segmenting the foreground image into at least one region, wherein each region represents a different person or object of interest in the scene captured by the currently selected range image;
 (e) projecting the segmented regions of the foreground image onto a ground plane of the scene;
 (f) designating the ground plane coordinates associated with each of the segmented foreground image regions as the location of a separate person or object of interest in the scene captured by the currently selected range image; and
 (g) repeating program modules (a) through (f) for as long as it is desired to track persons and objects in the scene.

55. The computer-readable memory of claim 54, wherein the program module for selecting a new range image generated subsequent to the last previously selected range image, comprises a sub-module for selecting the range image generated immediately following the last previously selected range image.

56. The computer-readable memory of claim 45, further comprising program modules for:
 (a) selecting a range image generated subsequent to the last previously selected range image;
 (b) designating the newly selected range image as the currently selected range image;
 (c) re-computing the background model; and
 (d) subtracting the background from a currently selected range image to produce a foreground image;
 (e) segmenting the foreground image into at least one region, wherein each region represents a different person or object of interest in the scene captured by the currently selected range image;
 (f) projecting the segmented regions of the foreground image onto a ground plane of the scene;
 (g) designating the ground plane coordinates associated with each of the segmented foreground image regions as the location of a separate person or object of interest in the scene captured by the currently selected range image; and
 (h) repeating program modules (a) through (g) for as long as it is desired to track persons and objects in the scene.

57. The computer-readable memory of claim 56, wherein the program module for selecting a range image generated subsequent to the last previously selected range image, comprises a sub-module for selecting the range image generated immediately following the last previously selected range image.

58. The computer-readable memory of claim 45, wherein the computer program further comprises a program module, executable prior to the execution of the program module for segmenting the foreground image, for morphologically growing and then shrinking the foreground image so as to connect separated regions associated with the same person or object.

59. The computer-readable memory of claim 58, wherein the program module for morphologically growing and shrinking the foreground image, comprises a sub-module for adding pixels in gaps between regions to the foreground image only when pixels in the vicinity of the gap exhibit similar depth values.

60. The computer-readable memory of claim 45, further comprising a program module for determining the identity of a person or object associated with a segmented region in the foreground image.

61. The computer-readable memory of claim 60, wherein the program module for determining the identity of a person or object associated with a segmented region in the foreground image, comprises sub-modules for:
 capturing an intensity image of the scene contemporaneously with the generation of the currently selected range image;
 identifying a region of said intensity image that corresponds in location within the scene to the segmented region in the foreground image;
 employing the identified region to determine the identity of the person or object represented by that region.

62. The computer-readable memory of claim 61, wherein the sub-module for employing the identified region to determine the identity of the person or object represented by that region, comprises sub-modules for:
 characterizing the identified region in a way similar to a series of stored intensity images of known persons and objects that are to be identified in said captured intensity-based image of the scene;
 comparing the characterized identified region to each of the stored, similarly characterized images;
 assessing the degree of similarity between the compared region and each image; and
 whenever a prescribed degree of similarity exists between the identified region and one of the stored images, designating the person or object represented by the identified region to be the person or object associated with that stored image.

63. The computer-readable memory of claim 61, wherein the intensity image of the scene is a color image.

64. The computer-readable memory of claim 45, further comprising a program module for refining the segmentation of a projected region prior to designating its ground plane coordinates so as to ensure the projected region represents only a single person or object.

65. The computer-readable memory of claim 64, wherein the program module for refining the segmentation of a projected region, comprises sub-modules for:
 cordoning the projected region into a series of cells;
 identifying one or more peak cells in the projected region, wherein a peak cell is one which contains the greatest number of pixels in comparison to neighboring cells located within a first prescribed radius of the cell and whose pixel density exceeds a prescribed threshold indicative of a density of pixels expected in a cell containing pixels representing a person or object of interest;

for each peak cell identified, conglomerating the regions contributing pixels to the peak cell as well as neighboring cells located within a second prescribed radius from the peak cell;

dividing any region contributing pixels to more than one conglomeration by reassigning each pixel of the region to the conglomeration associated with the closest peak cell to produce a revised conglomeration; and designating each revised conglomeration as a segmented ground plane region.

66. The computer-readable memory of claim 64, further comprising a program module for determining the identity of a person or object associated with a segmented ground plane region.

67. A system for determining the location of persons and objects in a scene, comprising:

a range imager module capable of generating a series of range images of the scene over time;

a background model generator module capable of computing a background model using only range information from a block of range images provided by the range imager module;

a background subtractor module capable of subtracting the background from a currently selected range image which was generated subsequent to said block of range images using the background model and provided to the background subtractor module by the range imager module, said subtracting resulting in a foreground image;

a foreground image segmenter module capable of segmenting the foreground image into at least one region, wherein each region represents a different person or object of interest in the scene captured in said currently selected range image;

an object locator module capable of projecting the segmented regions of the foreground image onto a ground plane of the scene and determining the location of each projected region on the ground plane; and an output module capable of outputting the ground plane coordinates associated with each of the projected regions.

68. The system of claim 67, further comprising a morphological operator module capable of morphologically growing and then shrinking the foreground image so as to connect separated regions associated with the same person or object prior to providing the foreground image to the foreground image segmentor module.

69. The system of claim 67, further comprising:

an imager module for capturing an intensity image of the scene contemporaneously with the generation of the currently selected range image;

an object identifier module capable of determining the identity of a person or object associated with a portion of the intensity image captured by the imager module which corresponds in location within the scene to a segmented region in the foreground image provided by the foreground image segmentor module.

70. The system of claim 67, wherein the object locator module is further capable of refining the segmentation of a projected region prior to determining the location the projected region on the ground plane, so as to ensure the projected region represents only a single person or object.

* * * * *